United States Patent [19]

Stapleton et al.

[11] Patent Number: 5,019,807
[45] Date of Patent: May 28, 1991

[54] DISPLAY SCREEN

[75] Inventors: John J. Stapleton; Barbara K. Stapleton, both of E. Brunswick, N.J.

[73] Assignee: StapleVision, Inc., Brunswick, N.Y.

[21] Appl. No.: 316,589

[22] Filed: Feb. 27, 1989

Related U.S. Application Data

[63] Continuation of Ser. No. 654,609, Jul. 25, 1984, abandoned.

[51] Int. Cl.⁵ .............................................. G09G 3/00
[52] U.S. Cl. ..................................... 340/718; 340/719; 340/777; 340/781; 340/825.81; 315/169.3
[58] Field of Search ............... 340/805, 811, 718, 719, 340/784, 703, 781, 777, 825.81, 704; 350/332; 315/169.3

[56] References Cited

U.S. PATENT DOCUMENTS

| | | | |
|---|---|---|---|
| 3,016,517 | 1/1962 | Saltzberg | 307/441 |
| 3,069,562 | 12/1962 | Steele | 307/441 |
| 3,142,819 | 7/1964 | Duinker et al. | 340/825.81 |
| 3,234,405 | 2/1966 | Cordero | 307/456 |
| 3,283,169 | 11/1966 | Libaw | 307/441 |
| 3,305,735 | 2/1967 | Moreines | 307/441 |
| 3,513,258 | 5/1970 | Rackman | 358/241 |
| 3,652,907 | 3/1972 | Page et al. | 357/4 |
| 3,657,613 | 4/1972 | Brody et al. | 357/23.7 |
| 3,665,455 | 5/1972 | Schmersal et al. | 340/778 |
| 3,675,075 | 7/1972 | Kohashi | 340/781 |
| 3,705,309 | 12/1972 | Brody | 250/551 |
| 3,848,248 | 11/1974 | MacIntyre, Jr. | 340/704 |
| 3,873,870 | 3/1975 | Fukushima et al. | 340/703 |
| 3,900,741 | 8/1975 | Fletcher et al. | 307/441 |
| 4,005,402 | 1/1977 | Amano | 340/781 |
| 4,006,383 | 2/1977 | Luo et al. | 315/169.3 |
| 4,034,243 | 7/1977 | Love et al. | 307/304 |
| 4,040,073 | 8/1977 | Luo | 357/4 |
| 4,042,854 | 8/1977 | Luo et al. | 340/781 |
| 4,110,664 | 9/1978 | Asars et al. | 340/719 |
| 4,112,466 | 9/1978 | Bendiks | 358/241 |
| 4,115,799 | 9/1978 | Luo | 357/71 |
| 4,135,959 | 1/1979 | Luo et al. | 156/230 |
| 4,149,885 | 4/1979 | Luo et al. | 430/320 |
| 4,155,030 | 5/1979 | Chang | 340/781 |
| 4,170,772 | 10/1979 | Bly | 340/781 |
| 4,235,525 | 11/1980 | Berman et al. | 350/339 R |
| 4,235,526 | 11/1980 | Berman et al. | 350/344 |
| 4,242,370 | 12/1980 | Abdalla et al. | 427/66 |
| 4,266,223 | 5/1981 | Frame | 340/781 |
| 4,331,758 | 5/1982 | Luo | 430/313 |
| 4,335,161 | 6/1982 | Luo | 437/205 |
| 4,342,925 | 8/1982 | Schick | 307/270 |
| 4,360,809 | 11/1982 | Bourgonje | 340/825.86 |
| 4,368,523 | 1/1983 | Kawate | 365/63 |
| 4,373,784 | 2/1983 | Nonomura et al. | 340/784 |
| 4,379,292 | 4/1983 | Minato et al. | 340/781 |
| 4,387,394 | 6/1983 | Powell | 358/139 |
| 4,400,731 | 8/1983 | Brown | 358/139 |
| 4,406,997 | 9/1983 | Depp et al. | 340/781 |
| 4,410,887 | 10/1983 | Stolov et al. | 340/784 |
| 4,413,257 | 11/1983 | Kramer et al. | 340/815.01 |
| 4,415,921 | 11/1983 | Mulvanny et al. | 358/139 |
| 4,468,659 | 8/1984 | Ohba et al. | 340/781 |
| 4,492,957 | 1/1985 | Marentic | 340/777 |
| 4,748,445 | 5/1988 | Togashi et al. | 340/811 |

OTHER PUBLICATIONS

"Flat-Panel Displays and CRTs", Van Nostrand Reinhold Company Inc., 1985, pp. 16–17.

Primary Examiner—Alvin E. Oberley
Assistant Examiner—Richard Hjerpe
Attorney, Agent, or Firm—Kane, Dalsimer, Sullivan, Kurucz, Levy, Eisele and Richard

[57] ABSTRACT

A large area retractable display screen for displaying video and/or color graphic images through the use of phosphorescent triad arrays being selectively activated by a limiting electric field controlled thereacross by an active matrix of fault-tolerant transistors and multiplexed front electrodes produced and supported on a flexible substrate.

12 Claims, 8 Drawing Sheets

DISPLAY SCREEN

RELATION APPLICATIONS

This is a continuation of application Ser. No. 654,609, filed Sept. 25, 1984, now abandoned.

FIELD OF THE INVENTION

The present invention is directed towards a flexible screen for displaying images, including images generated from video signals.

BACKGROUND OF THE INVENTION

There presently exists an ever expanding interest in new and large forms of displaying images, particularly video signals. This can be seen in the expanding market for large screen television and flat panel display devices. With regard to the large screen televisions, these usually utilized a projector which is somewhat cumbersome and inefficient. Flat panel display devices have not as yet developed into satisfactory large screen applications.

In addition, often times due to the size of such devices, it is desirable that they be stored when not in use. This becomes impractical because of their size and relatively fixed construction.

Accordingly, there exists a need for a large display screen which provides versatility in use and storage, yet provides satisfactory resolution.

SUMMARY OF THE INVENTION

It is a principle object of the invention to provide a large self-emitting display screen for color TV images or data and color graphics which is flexible and accordingly retractable allowing for ready storage such as that provided by roll up movie screens or window shades.

It is another object of the invention to provide a flexible display screen which provides higher resolution in large screens.

A yet further object is to provide a flexible display screen which includes redundant circuitry so as to reduce the likelihood of failure for more effective operation.

The present invention provides for a flexible, multi-layered self-emitting display screen for use in data and color graphics, television display and/or even overlay capabilities. The screen is fabricated out of a series of layered components on a transparent mylar substrate. The layers include thin film transistors to be utilized in driving pixels of phosphorescent powder dots deposited as Red, Green, Blue (RGB). Unlike picture tube phosphors that are excited by high energy electrons, these phosphors emit light due to the electric field strength selectively created across them. The array of RGB phosphor dots produce all colors that are necessary and are arranged hexagonally in triads with the driving transistors activated by horizontal rows and vertical column addresses. Field Effect Transistors (FET) provided in a totem pole arrangement are used to drive the phosphorescent triads and provide sufficient redundancy for effective operation.

In one embodiment, a single pair of totem pole transistors is used to drive the phosphorescent triad (RGB). In another embodiment, each phosphor dot (R, G, B) is individually driven by respective totem pole transistors.

The system is able to take standard video signals and convert them via a scan converter system to activate the rows of pixels to produce a high definition picture.

Due to the flexible nature of the screen, it can be rolled up for storage readily when not in use, or wrapped around viewers for three dimensional displays.

BRIEF DESCRIPTION OF THE DRAWINGS

The aforenoted objects, advantages and others will be realized by the present invention, the description of which should be taken in conjunction with the drawings, wherein.

DETAILED DESCRIPTION OF THE PREFERRED EMBODIMENTS

Figure 1:
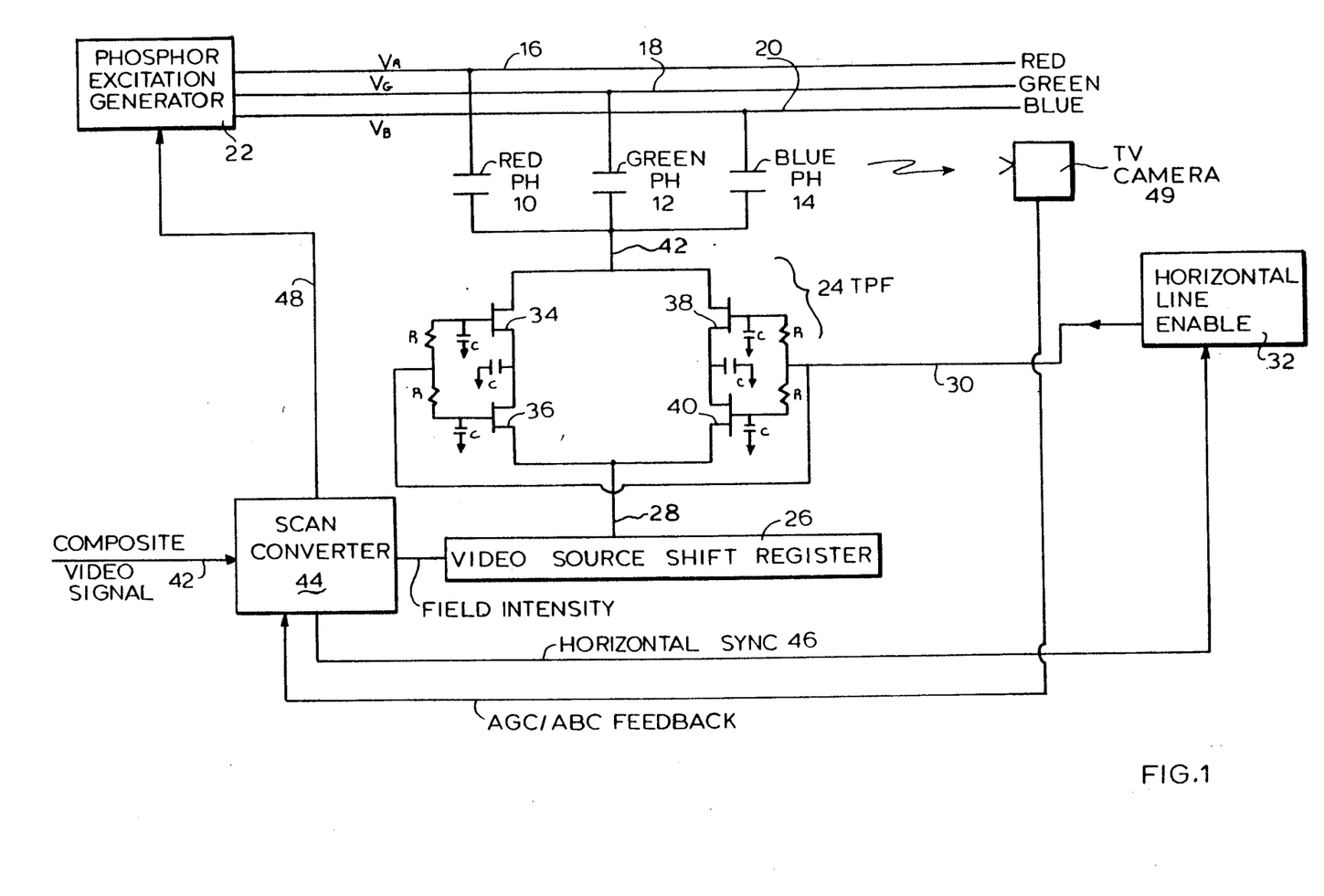
FIG. 1 shows a schematic diagram of a first embodiment of the invention.

A first embodiment of the present invention is shown diagrammatically in FIG. 1. In this figure three phosphorescent elements or dots 10, 12 and 14 are shown with said elements comprising red, green and blue phosphors which, when properly excited, may be combined to produce a chromatic pixel for generating video images and/or data and color graphic displays in a known manner. Physically, these elements are embedded in a flexible multi-layered screen, described in more detail below.

Electrically, these phosphorescent elements may be shown as capacitive elements as indicated in said FIG. 1. One side of each of the elements is connected to one of the phosphor excitation buses or electrodes 16, 18 or 20, respectively. These buses are common to the elements of all the pixels of the flexible screen, and are connected to a phosphor excitation generator 22. Alternatively, separate buses (one for each primary color) may be provided for each column of pixels. This generator is adapted to generate an appropriate a.c. voltage $V_R$, $V_G$ and $V_B$ on buses 16, 18 and 20, respectively, which can be optimized to reduce cross talk in the individual application.

The other terminal of each of the phosphorescent elements are tied to a pair of Totem-Pole FET element 24, hereinafter referred to as a TPF. In this particular embodiment which involves datagraphics, TPF 24 may be regarded as a switch provided for connecting the phosphorescent elements to a video source shift register 26 via line (column) 28. The switch is closed when a voltage is present on line (row) 30 from horizontal line enable circuit 32.

Preferably, TPF 24 comprises four FET's, 34 36, 38 and 40. The FET's arranged to form two parallel branches between nodal point 42 (tied to the phosphorescent elements) and line 28, each branch comprising two FET's connected in series. Ideally, i.e., if all the FET's are functional, each FET is turned on simultaneously by a signal from line 30 which is connected to the FET gates through an isolation resistor R. However, if any one of the FET's is shorted or opened during the manufacturing process, the operation of the TPF is unaffected. Furthermore, the TPF may be operational even if two or three manufacturing faults occur due to the built-in redundancy of the circuit.

Each FET has an inherent parasitic capacitance C which advantageously keeps the TPF 24 on even after the signal is removed from line 30, thereby increasing the latent image of the pixel. If the parasitic capacitance of the FET's are insufficient, a discrete capacitor C may be formed simultaneously with the FET's. Resistors R may also be TFT as taught by U.S. Pat. No. 4,006,383.

Figure 2:
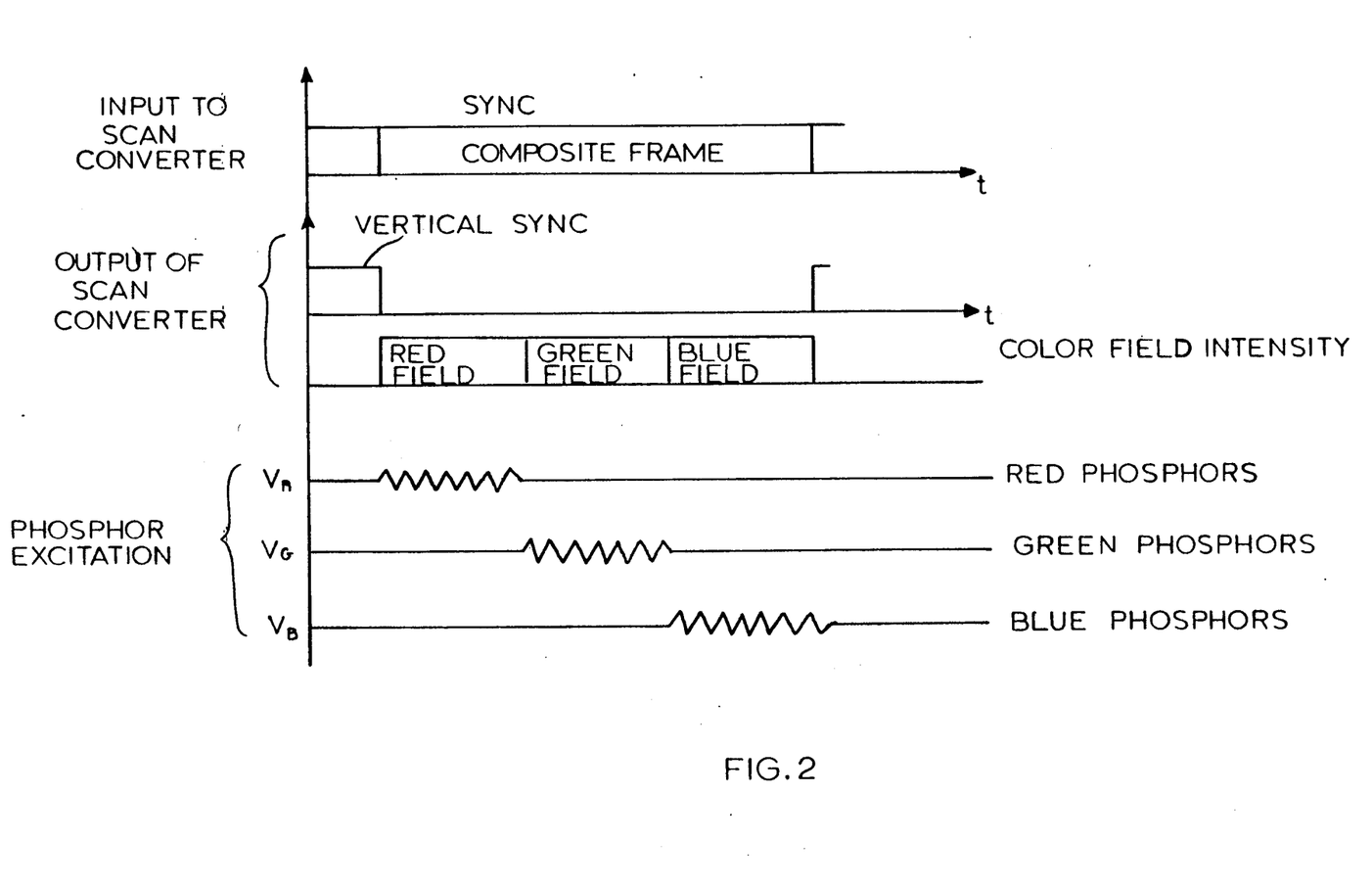
FIG. 2 shows diagrammatically various signals associated with the embodiment of FIG. 1.

The phosphorescent elements are energized as follows. A composite video signal (i.e., standard color TV signal, data graphic signal, etc.) received on line 42 is fed to a scan converter 44. The scan converter 44 has two functions. The first function is to convert the composite video signals into corresponding video source signals indicative of the required field intensity of the three phosphorescent elements of the pixels. In addition, conventional TV receivers are adapted to interlace the horizontal lines of a particular image by scanning alternate horizontal lines. The composite video signals are sequenced to conform to this type of operation. However, for large display screens contemplated by the present invention, interlacing produces a very noticeable and unacceptable flicker in the image. Therefore, in the present invention, the elements of each pixel on a given line are energized simultaneously and the lines are energized sequentially, starting from the top line of the display screen. More particularly, first all the red elements of the display screens are energized, then all the green elements and finally all the blue elements. Thus, the second function of the scan converter is to produce the video source signals for each line in the sequential (rather than alternate) order. The video source signals for each line are fed to the video source analog shift register, also commonly known as a bucket-brigade register 26. The shift register 26 is a series-in/parallel-out type register with a plurality of cells (not shown) corresponding to the number of pixels per screen line. When a particular TPF 24 is energized, one of the phosphorescent elements, such as the red element 10, is excited by the appropriate excitation voltage on bus 16 at the field intensity corresponding to the video source signal received from a corresponding cell of register 26. After all the red elements of each pixel are energized line-by-line, the process is repeated for the green and blue elements to generate the desired image on the display screen. The various signals discussed above are shown diagrammatically in FIG. 2.

Alternatively, each pixel may be completely energized line-by-line. In other words, all the red, green and blue phosphorescent elements may be energized before energizing the next line.

The scan converter also separates the horizontal sync signal from the composite video signal and sends it on line 46 to horizontal line enable circuit 32. Circuit 32 is essentially a ring counter adapted to turn on each row of the display screen sequentially by sending an appropriate signal on line 30 as described above. The horizontal sync signal is used to initiate the top line of each image. Note that while a typical TV CRT Raster scans the picture 30 times per second, the present device is intended to operate at least three times this rate to provide satisfactory resolution.

The phosphor excitation generator also receives a sync signal from the scan converter on line 48. In response, the generator generates the appropriate voltage signals $V_R$, $V_G$ and $V_B$ to reduce cross-talk between the phosphorescent elements of a pixel, which can be optimized with the particular application.

A scan converter 44 for implementing the functions described above is shown in FIG. 3. It comprises an analog-to-digital converter 50 for converting the composite video signal into digital signals. A sync separator 52 is used to separate the horizontal sync signal from the composite signal. This horizontal sync signal is sent to the horizontal line to enable circuit 32 of FIG. 1, and is also provided a timing control circuit 54.

Figure 3:
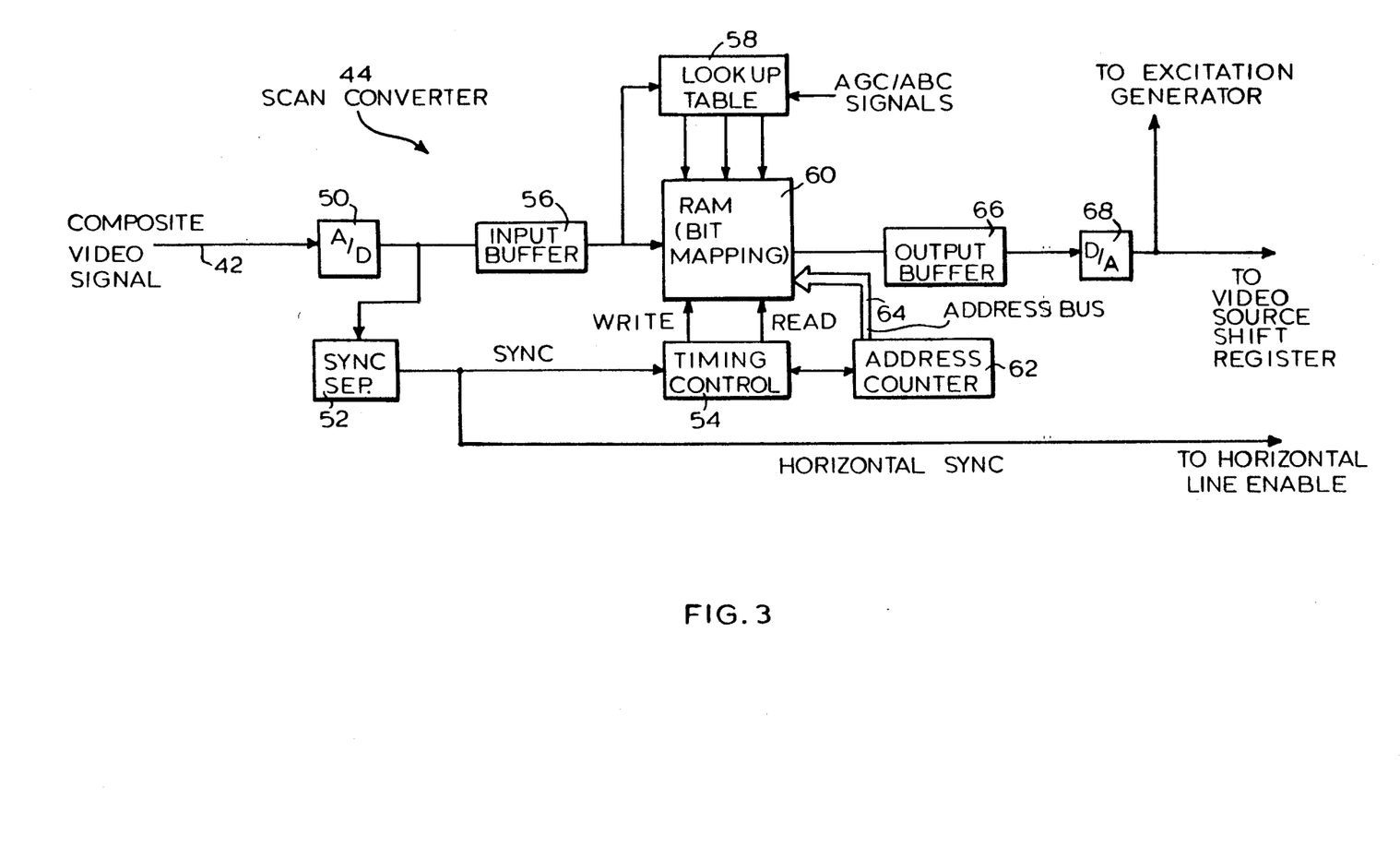
FIG. 3 shows details of a scan converter.

The output of A/D converter 50 is also sent to an input buffer 56 and then to a look-up table 58. The look-up table generates a video source signal indicative of the field intensity of each pixel element corresponding to the digital value of the video signal received from buffer 56. These video source signals are stored line-by-line and field-by-field into a RAM (random access memory) 60. RAM 60 operates under the control of timing control circuit 54 which also operates an address counter 62. The address counter is adapted to generate addresses for storing the video source signals in a predetermined manner. For example, the fields (i.e., red, green and blue) could be stored sequentially, in different areas of RAM 60. The addresses generated by counter 62 are provided to RAM 60 on an address bus 64.

Timing control circuit 54 generates WRITE signals for entering the video source signals into the RAM 60. The timing control circuit also generates a READ signal for reading the video source signals out of the RAM in a preselected sequence in accordance to ADDRESS BUS 62. The READ and WRITE signals are alternated in the usual manner. The video source signals from the RAM are sent to an output buffer 66 and to a D/A converter 68. The output of the D/A converter 68 is sent to the shift register 26 and phosphor excitation generator 22 shown in FIG. 3.

An auxiliary TV camera 49 may also be used to monitor the display screen. The image (or at least a portion of it) is picked up by camera 49 and sent to the scan converter 44. This signal is used as an automatic gain control and/or automatic brightness control feedback signal. Look-up table 58 (FIG. 3) uses these signals to correct the video source signals to the RAM 60.

Figure 7A:
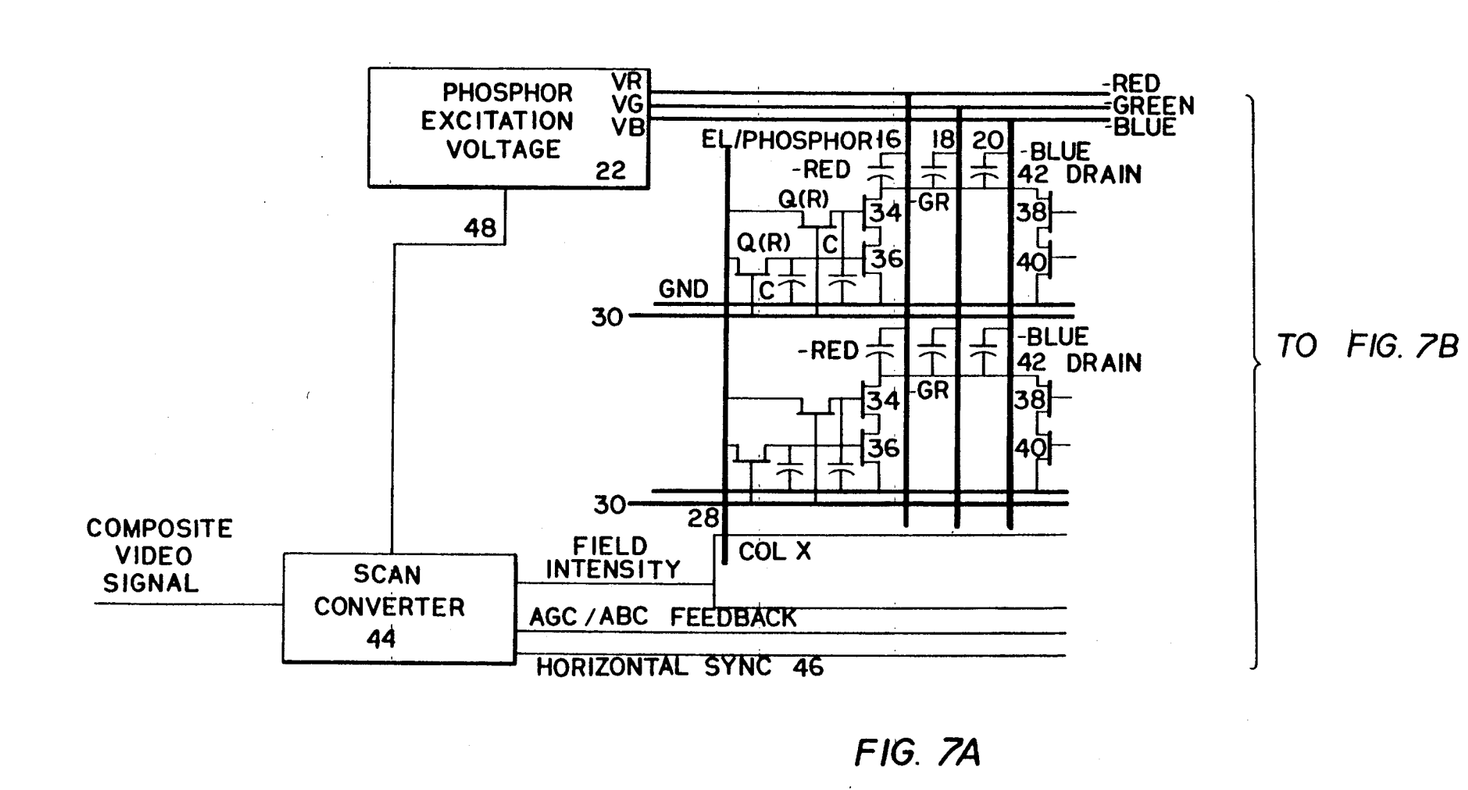
FIG. 7 illustrates another embodiment of the invention.
Figure 7B:
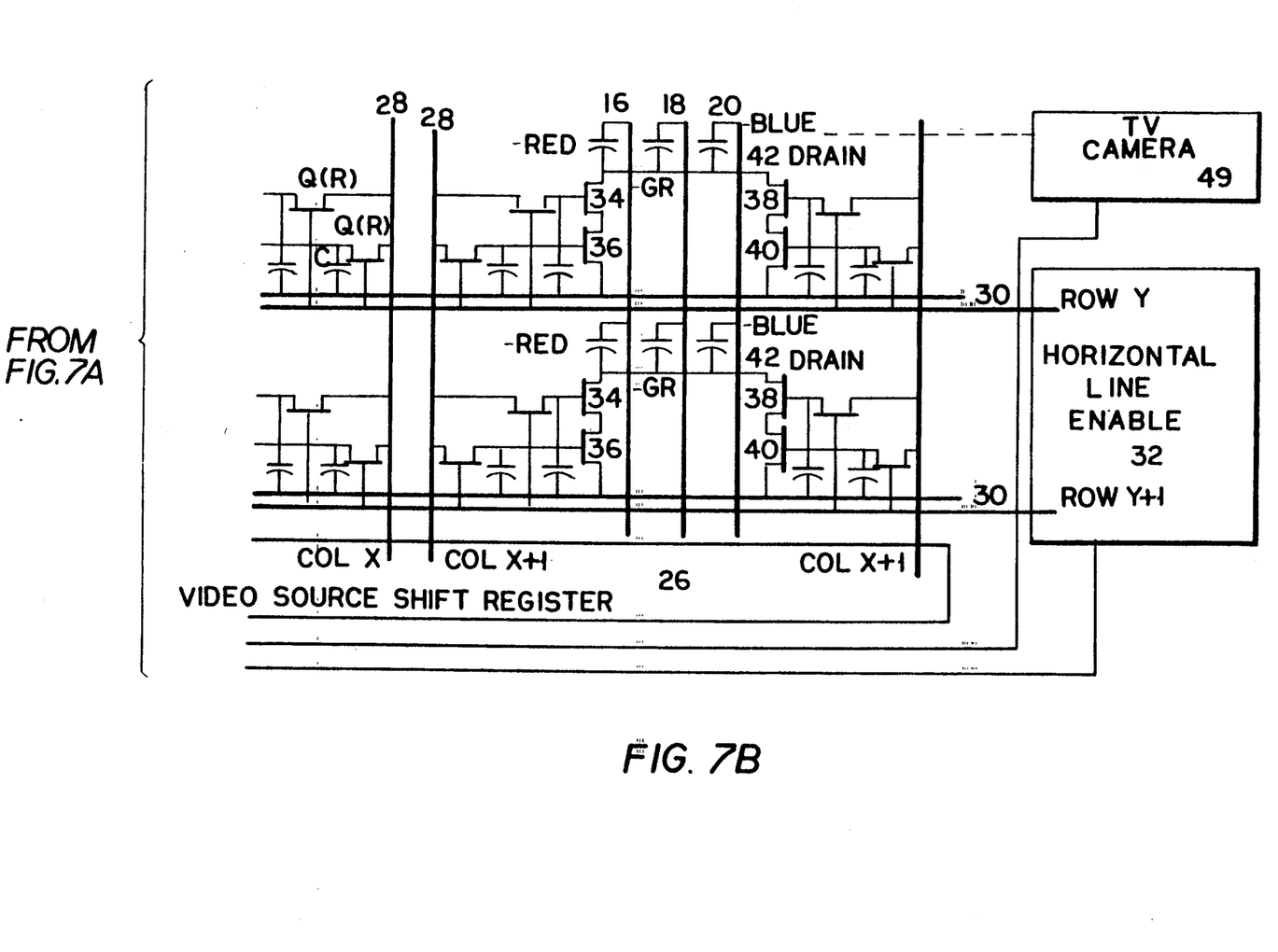

FIG. 7 shows the activation of the four pixels at coordinates X, Y; X, Y+1; X+1, Y; and X+1, Y+1 through the corresponding TPF switches 24 as described above.

Figure 4:
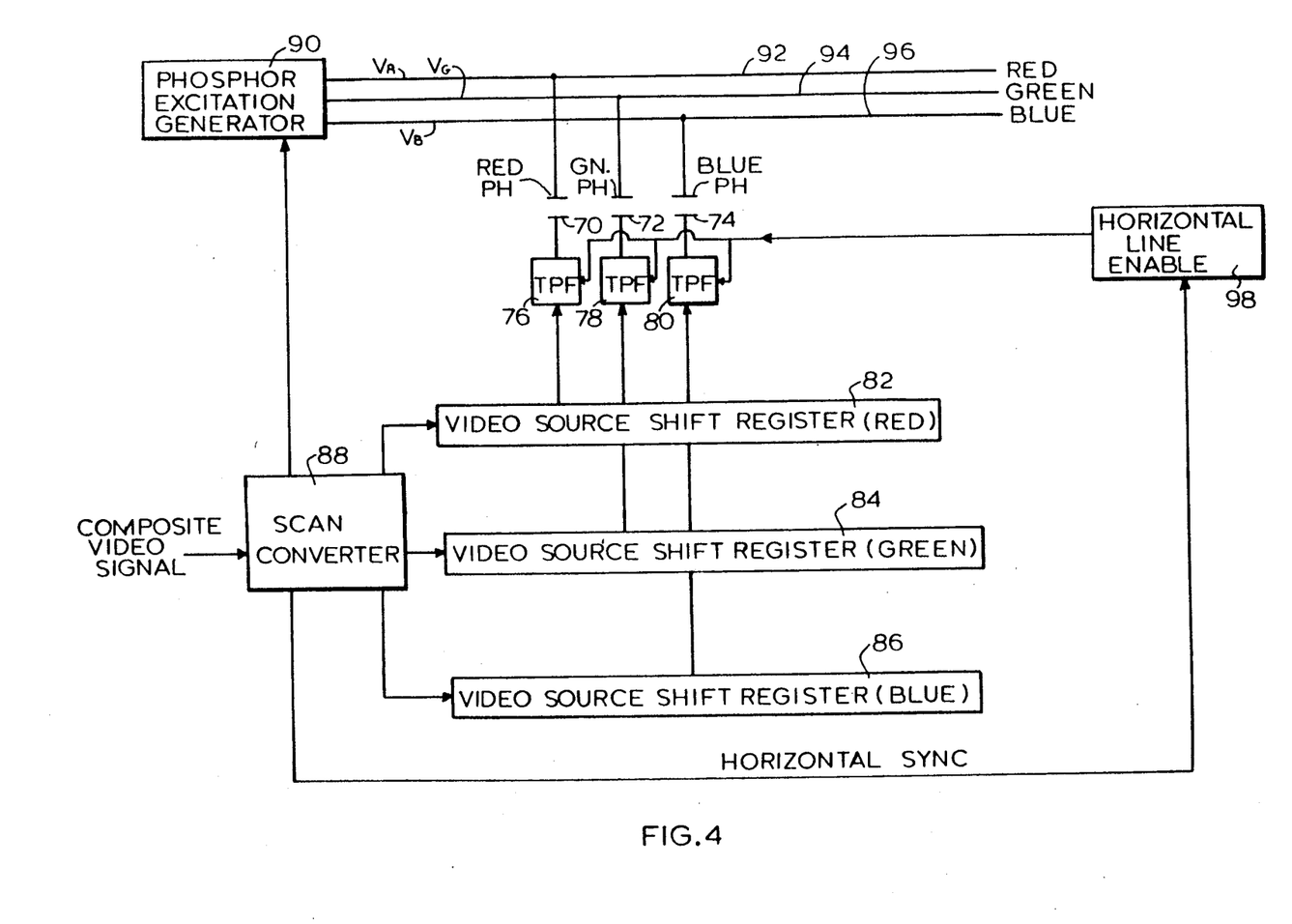
FIG. 4 shows a diagram of a second embodiment of the invention.

An alternate embodiment of the invention is shown in FIG. 4. In this embodiment each phosphorescent element 70, 72 and 74 corresponding to a particular pixel is connected to individual TPF's 76, 78 and 80, respectively, as shown. Three different serial-to-parallel shift registers 82, 84 and 86 are provided, one for each field, and each phosphorescent element 70, 72 and 74 is connected to the appropriate shift register by a corresponding TPF. Scan converter 88 still separates the incoming composite video signal into video source signals for each field. However, these signals are sent to the appropriate shift registers simultaneously, rather than sequentially.

A phosphor excitation generator 90 is also provided for generating appropriate voltages on buses 92, 94 and 96.

Alternatively, a single phosphor excitation bus may be used for all the pixels of the image, or all the pixels oriented along a particular vertical line since in this configuration there is no cross-talk between the phosphorescent elements of a pixel. Finally, horizontal line enable circuit 98 is adapted to energize all pixel elements of a given screen line simultaneously.

The operation of the embodiment of FIG. 4 is obvious from the above description. The video source signals for each pixel element of a given screen line are fed to one of the shift registers. Generator 90 provides appropriate excitation voltages on buses 92,94,96 simultaneously. All the pixel elements of the screen line are enabled simultaneously by circuit 98 by energizing the appropriate TPF's. Each element is therefore connected at one end to the appropriate excitation bus 92,94, or 96 and at the other end to the appropriate cell of one of the registers 82,84 and 86. Horizontal line enable circuit 98 energizes each line of the screen sequentially starting with the top line in accordance with the horizontal sync signal, and all the elements of a given line are energized simultaneously.

Figure 5:
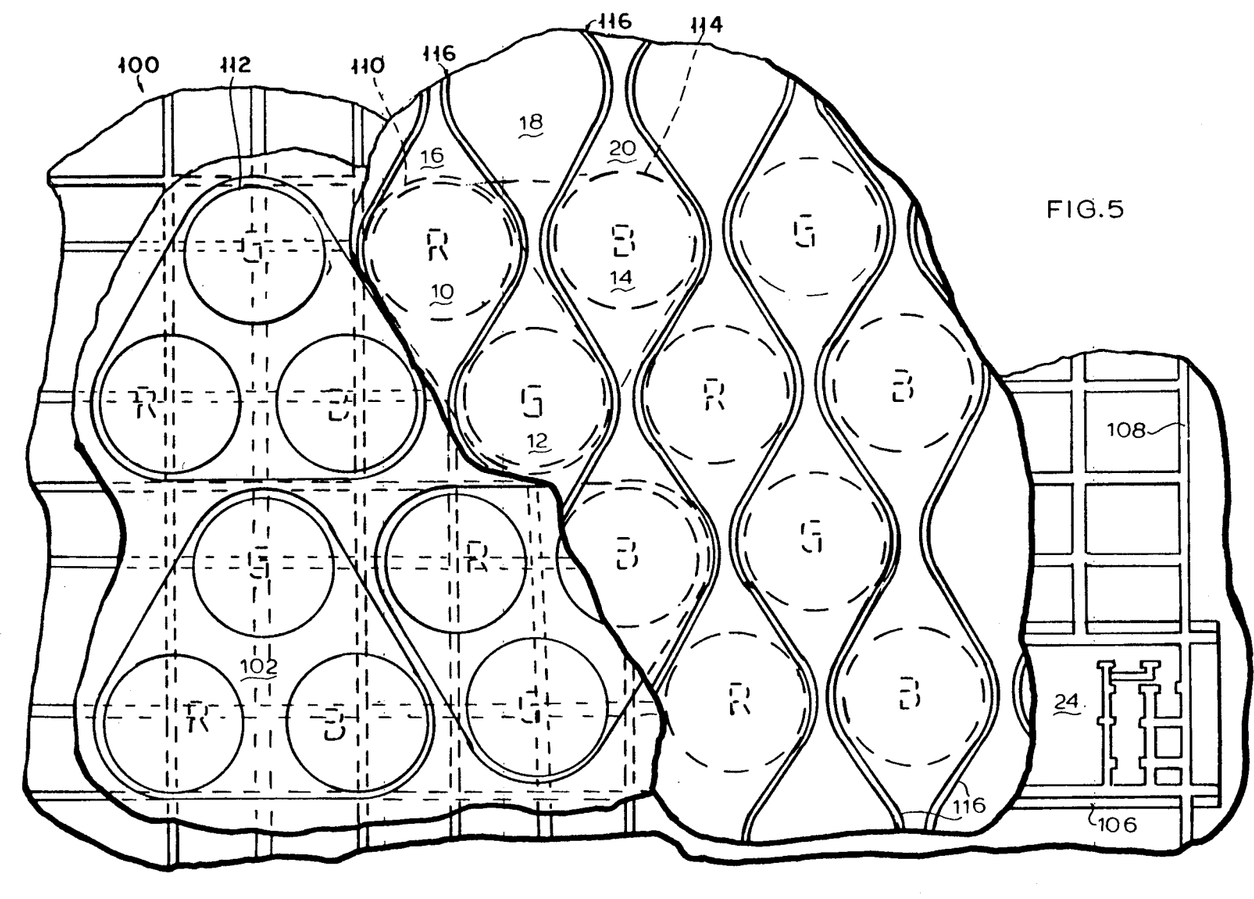
FIG. 5 is a perspective, partially phantom view showing the arrangement of the phosphorescent dots, front electrodes orthogonal addressing.

Turning now to FIG. 5, there is shown a greatly enlarged view of the multi-layered screen 100. The screen 100 is formed from a number of layers, many of which are transparent as will more fully be discussed with regard to FIG. 6. FIG. 5 however clearly illustrates the hexagonals 102 on which the red (R) 110, green (G) 112, and blue (B) 114 phosphorescent dots are positioned. These dots or phosphor triad are capacitively coupled to the drain electrodes of the TPF element 24, which is positioned therebelow. The respective TPF elements 24 serve to drive respective phosphor triads in the hexagonals 102. As shown in FIG. 1, the redundant pair of these thin film transistors (TFT) have their sources connected to the drains of the adjacent pairs with their sources coupled to the video source shift register 26. All four of the TFT (24) beneath each phosphor triad have their gates connected through fault isolating film resistors to the horizontal line enable 32 via rows 106. Such fault tolerant circuitry overcomes both short and open circuit failures that have plagued flat panel displays. A TPF (24) is representatively shown and would be positioned beneath the hexagonals 102 and coupled to respective row 106 and column 108 of the orthogonal array shown. Note that respective row and column addresses are shown for the particular phosphor dots as discussed with regard to the second embodiment. However, addressing in the first embodiment with one TPF per triad would of course use less rows and columns due to the common TPF.

Phosphorescent excitation electrodes 16,18 and 20 are shown as transparent front electrodes separated by gaps 116 (i.e., 3 mil). These electrodes are positioned independently with respect to each other above the columns of Red, Green and Blue phosphorescent dots as shown. The electrodes are coupled to the phosphor excitation generator as shown in FIG. 1.

Note that one TPF 24 as shown serves to drive the phosphorescent triad, as described with regard to FIG. 1. The large screen display provides for sufficient area that three TPF (76,78 and 80) could be positioned beneath the phosphorescent triad each driving individual phosphorescent deposits (70,72 and 74) as shown in FIG. 4. In addition the number of picture elements can vary, for example, for a color graphic screen having 1080×1440 picture elements to high definition television having 1024×1536, yet be compatible via 88 with standard 525/625 line TV.

Figure 6:
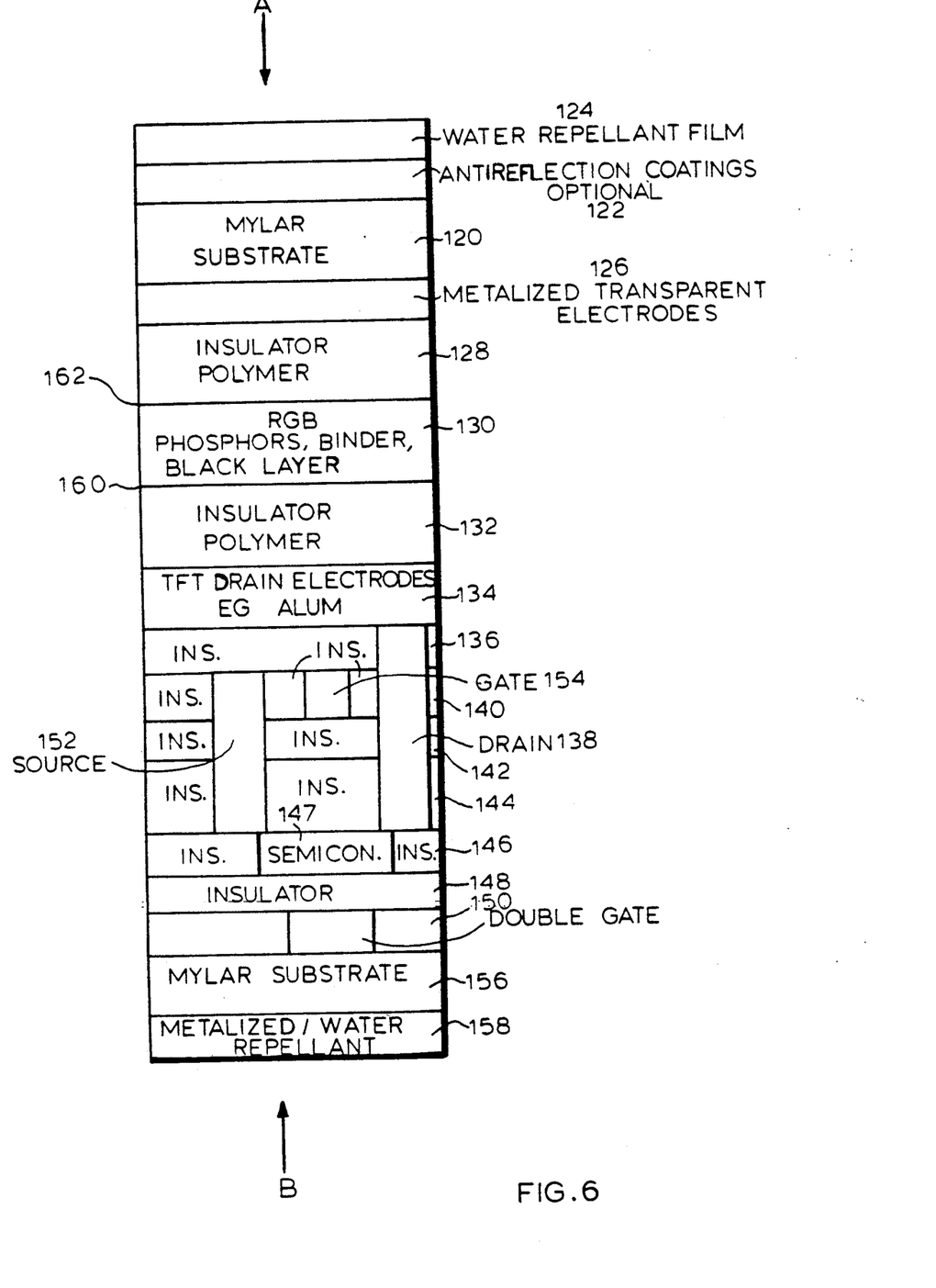
FIG. 6 is a cross sectional view of the screen detailing the various layers thereof.

Turning now to FIG. 6, there is shown an enlarged across sectional view of the display screen. The cross section 118 of the screen 100 is formed from a plurality of layers. In this regard, a mylar (registered trademark of Dupont) polyester substrate 120 having a light transmission rate of 20-50% is provided having a nominal thickness of approximately 76 microns. On one of its sides is an anti-reflection coating 122 along with a protective water repellant film 124 made out of, for example, Seran.

On the opposite side of the mylar 124, are the metalized transparent electrodes or buses 16-20 now indicated by numeral 126. Such a transparent electrode may be formed with a transparent substance such as a plastic having sufficient amounts of gold, silver or perhaps indium Trioxide to provide the necessary conductivity suitable for purpose, while being imperceivable to the naked eye. The thickness of layer 126 is approximately 0.02-0.25 microns and may be formed by vapor depositing, vacuum metalizing or cathode sputtering, for example. The conductive electrodes are formed in strip overlays over vertical columns of phosphor dots of like color as previously discussed.

The next layer is that as an insulator 128 formed out of a polymer coating or $Ba\,Ti\,O_3$ and may be approximately 40microns in thickness.

Layer 130 provides for the RGB phosphorescent dot deposits in the hexagonal manner as shown in FIG. 5. This may be applied by silk screening. Layer 132 is formed as an insulator similar to layer 128, one of which may be reflective. Layers 130 and 132 may be formed having a thickness of approximately 40 microns.

The next layer 134 provides the drain electrodes for the thin film transistors and its thickness is approximately 0.12-0.2 microns. As noted earlier, the phosphor triad is capactively coupled to the TPF with a common drain formed as the hexagonals 102. Layer 136 is provided as a photoresist or acrylate insulator having a nominal thickness of approximately 5 microns. Note that the drain 138 of the single FET being shown passes through a portion of layer 136 and couples with the drain provided by layer 134.

The next layers 140-150 provide for the FET in a typical double gate arrangement fabricated by well known thin film transistor technology having respective layer thicknesses of 0.12-0.2 microns; 0.4 microns nominal; 0.12-0.2 microns; 0.02-0.05 microns; 0.4 microns and 0.1-0.2 microns. Note that "INS" is used to indicate an insulator; and that a typical semiconductive material used at 147 may be Cd Se, silicon or like. In addition, the gate and source of the FET are indicated respectfully by numerals 152 and 154. Note that while only one FET of the totem (TPF) arrangement is shown, the pairs of transistors are fabricated in a planar arrangement and appropriately coupled.

Layer 156 is again a mylar substrate similar to layer 120 having a water repellant layer 158 on its opposite side.

The screen 100 as now fabricated would be relatively flexible so as to enable it to be retractable. In addition, the screen 100 would be relatively transparent so as to allow it to be an overlay, if so desired. However, to provide a background for the phosphorescent triads, a black layer could be provided at 160 which would restrict view in the direction of arrow A. Layer 158 in such a case may be metalized. If the black layer was put at 162, then viewing would be along arrow B and a metalized surface might be used as layer 124.

Note that for assembling the layers together, layers may be successively added to the mylar substrates 120 and 156 with the two assemblages joined together. Of course any means suitable for purpose may also be utilized. The preferred method of manufacture is, however, reel-to-reel.

In addition, while certain thicknesses for the different layers have been set forth, they are illustrative and should not be considered exclusive.

Thus, the present invention realizes the aforenoted objects, advantages and others and although preferred embodiments have been disclosed and described in detail herein, its scope should not be limited thereby, rather its scope should be determined by that of the appended claims.

What is claimed is:

1. A large area display screen for displaying video and/or color graphic images, said screen comprising:
   a plurality of picture elements arranged in color triads for generating light in response to an electric filed, said color triads being arranged in a two dimensional matrix of orthogonal rows and columns, with each triad being disposed at an intersection between a row and a column;
   support means for supporting said picture elements;
   driving means including row selection means for selecting said row and column selection means for selecting said column, said row and column selection means cooperating to select the rows and columns of said matrix in a preselected pattern;
   a plurality of switching circuits, each switching circuit being connected to one of said rows and one of said columns and to at least one triad to update said triad when the corresponding row and column is selected respectively by said row selection means and said column selection means, each switching circuit including a plurality of parallel circuit branches, each branch including at least two thin film switching transistors in series, each said switching circuit being arranged to selectively activate said triad when all of the switching transistors are functional or when at least one of the thin film switching transistors of a switching circuit is functional and at least one of the remaining thin film switching transistors of that switching circuit is shorted or opened, said switching circuits forming a fault tolerant network immune to short and open circuits.

2. The display of claim 1 further comprising a video scan converter for generating video driving signals and demultiplexing electrodes for distributing said video driving signals to said driving means.

3. The display of claim 1 wherein said color triads are arranged hexagonally on said support means.

4. The display of claim 1 wherein each triad includes an R, a G and a B picture element, and said driving means includes a corresponding R, G and B bus.

5. The display of claim 1 wherein each switching circuit includes a plurality of resistors connecting said thin film switching transistors to said driving means to isolate faults.

6. The display of claim 1 wherein said switching circuit includes a plurality of connecting transistors for connecting said thin film switching transistors to said driving means to isolate faults.

7. The display of claim 1 wherein each triad includes a complementary R, complementary G and complementary B picture element, and said driving means includes a corresponding complementary R, G and B bus.

8. THe display of claim 2 wherein said support is flexible.

9. A large area display screen for displaying video and/or color graphic images, said screen comprising:
   a plurality of picture elements for generating light in response to an electric field, said picture elements being arranged in a two dimensional matrix of orthogonal rows and columns, with each picture element being disposed at an intersection between a row and a column;
   support means for supporting said picture elements;
   driving means including row selections means for selecting said row and column selection means for selecting said column, said row and column selection means cooperating to select the rows and columns of said matrix in a preselected pattern;
   a plurality of switching circuits, each switching circuit being connected to one of said rows and one of said columns and to a picture element to activate said picture element when the corresponding row and column is selected respectively by said row selection means and said column selection means, each switching circuit including a plurality of parallel circuit branches, each branch including at least two thin film switching transistors in series, each said switching circuit being arranged to selectively activate said picture element when all the switching transistors are functional or when at least one of said thin film switching transistors of a switching circuit is functional and at least one of the remaining thin film switching transistors of the switching circuit is shorted or opened; said switching circuits forming a fault tolerant network immune to short and open circuits.

10. The display screen of claim 9 wherein said support is flexible.

11. The display screen of claim 9 wherein each said picture element includes a first terminal and a second terminal, said first terminal being connected to one of said switching circuits, and wherein said driving means includes bus means connected to the second terminal of each picture element.

12. The display screen of claim 9 wherein said row selection means selects one of said rows of said matrix in sequence and wherein said column selection means includes shift register means receiving video signals and for transmitting video signals corresponding to a particular row to all the columns simultaneously.

* * * * *

UNITED STATES PATENT AND TRADEMARK OFFICE
CERTIFICATE OF CORRECTION

PATENT NO. : 5,019,807

DATED : May 28, 1991

INVENTOR(S) : John J. Stapleton and Barbara K. Stapleton

It is certified that error appears in the above-identified patent and that said Letters Patent is hereby corrected as shown below:

```
Column 7, line 17:
Claim 1, line 5, delete "filed" and substitute
therefore --field--.
```

Signed and Sealed this

Seventeenth Day of November, 1992

Attest:

DOUGLAS B. COMER

*Attesting Officer*  *Acting Commissioner of Patents and Trademarks*